March 19, 1963 A. AMMANN 3,082,106
METHODS FOR THE MANUFACTURE OF MORTAR AND CONCRETE
Filed May 27, 1955
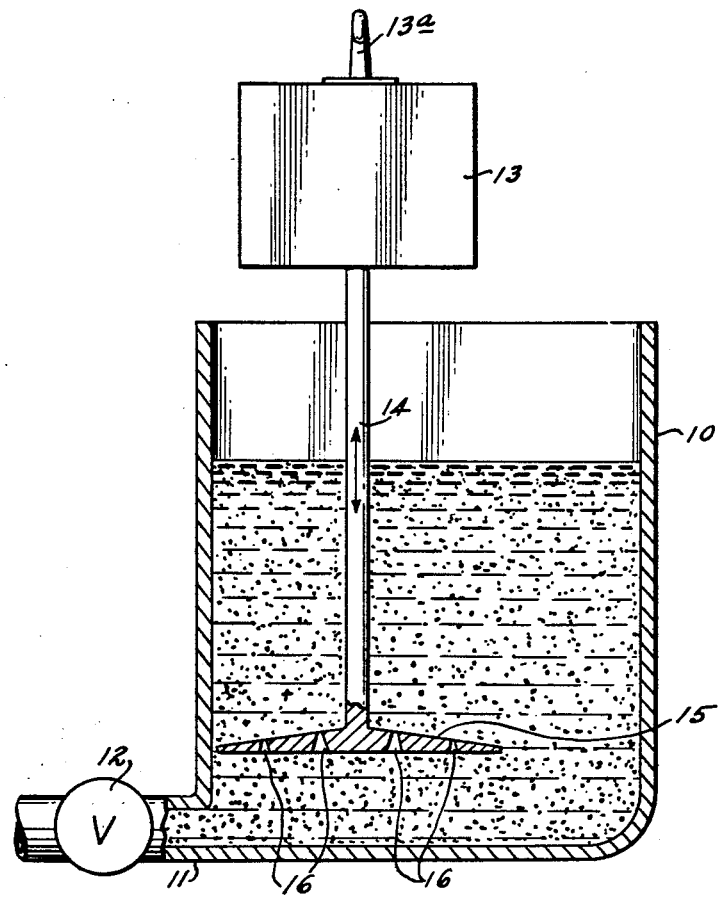
INVENTOR.
ALPHONS AMMANN
BY
ATTORNEY.

United States Patent Office 3,082,106
Patented Mar. 19, 1963

3,082,106
METHODS FOR THE MANUFACTURE OF
MORTAR AND CONCRETE
Alphons Ammann, Zurich, Switzerland, assignor to Kaspar Winkler & Co. Inhaber Dr. F. Schenker-Winkler, Zurich, Switzerland, a Swiss firm
Filed May 27, 1955, Ser. No. 511,799
Claims priority, application Switzerland May 28, 1954
4 Claims. (Cl. 106—98)

In methods for sealing foundations, rocks, permeable concrete, and the like, by the injection of suspensions of cement; in the manufacture of concrete, where the interstices between the aggregate are filled by the injection or introduction of cement-sand-mortar or cement-sand-water-mixtures; and in methods for filling channels in hardened concrete for making pre-stressed concrete; the cement or cement-sand-mortar requires comparatively large quantities of water in order to ensure good mobility thereof so that it can be pumped without difficulty. The introduced mixture must flow into and completely fill all of the hollow spaces or interstices and further bond securely with the material defining the spaces so as to form a final structure which is as dense and pressure-resistant as possible. However, the greater the quantity of water employed, and the coarser the cement and the particles of the aggregate in the injection mortar, the greater is the danger of separating the mortar mixture by sedimentation of the solids in the aqueous suspension. It is therefore necessary to keep such cement-water- or cement-sand-water-mixtures in constant motion by stirring until they are used.

After the mortar has been placed in the hollow spaces, it can be left to harden, but sedimentation of the solids and separation of the water can take place, as long as the mixture is still soft, and the speed and extent of the sedimentation and separation will be increased, the greater the water content and the coarser the solids. If the sedimentation is insignificant, a hard mortar of low density, which is impervious to water, and has a high strength is obtained; but if much water is separated from a mixture having the same composition, one obtains a solidified cement mortar of better quality but with more spaces filled with water.

Different methods have been tried to improve the quality of mortars of this type, for instance, as in the Colcrete method, by passing the cement-water-mixture through a narrow gap in a special mixer for a sufficiently long period. The friction is intended to transform the mortar into a colloidal form. It is a disadvantage of this method that a considerable excess of water must still be used.

Other methods seek to effect stabilization of the cement-water- or cement-water-sand-mixtures by hydraulic additions of puzzolanes, quick ashes, or other inert materials in a very finely divided form, such as in the Prepact method. It has now been found that cement mixtures became much more mobile if they are subjected to a vibration treatment. The treatment of the cement-water or cement-water-sand mixtures may be carried out immediately after the mixing of the components, or only after a certain interval, but in any case prior to the pouring or other use thereof, in a vessel with an immersion vibrator as is used, for instance, for the consolidation of concrete. Owing to the more or less rapid separation of the cement or the cement and sand from the water, it is necessary to stir the mixture intensively while the mixture is being subjected to the vibrations. The use, for the vibration treatment, of a vibration mixer, which acts simultaneously as a vibrator and as a mixer, represents therefore a considerable simplification and a progress in the method. By means of this mixer, which is provided with a plate of glass or chromium steel, having tapered holes and being vibrated vertically, the suspension is made to flow downwards or upwards, according to the direction of taper of the holes, and the mixture is at the same time vibrated and stirred, that is to say, mixed. The intensity of the vibration treatment and of the stirring effect can be regulated freely by varying the frequency or the amplitude of the vibrations.

The accompanying drawing is a vertical, sectional view of a device suitable for effecting the simultaneous vibrating and mixing of the components of a mortar mixture in accordance with the present invention.

Referring to the drawing in detail, it will be seen that such a device includes a container 10 open at the top to receive the components of the mortar mixture that are to be simultaneously vibrated and mixed and having an outlet or discharge pipe 11 extending from the bottom which is controlled by a suitable valve 12. A conventional vibrator 13, which may be electrically operated, has a hook 13a on the top thereof for suspension above the container 10, and a depending vertical shaft 14 which extends into the mortar mixture within the container and is vibrated vertically, as indicated by the two-headed arrow, by the vibrator 10.

A plate 15, which may be circular in plan-form, is secured to the lower end of shaft 14 and extends in a horizontal plane. The plate 15 is formed with a plurality of tapering or frusto-conical openings 16 extending therethrough. In the illustrated device, the openings 16 taper upwardly, that is, the diameter of each opening 16 at the upper face of the plate 15 is smaller than the diameter of the corresponding opening at the lower face of the plate 15. Thus, as the plate 15 is vertically reciprocated, the mortar mixture within the container 10 is subjected to corresponding vibration and, by reason of the tapering configuration of the openings 16, the tendency of the mixture to pass through the openings 16 during the downward stroke of the plate 15 is greater than the tendency to flow through the openings during the upward stroke, so that a general circulation or flow is set-up within the mixture in the container to simultaneously effect stirring or mixing of the mortar components.

Experiments with the method embodying this invention have shown that there is not only a considerable liquefaction of the mixture of cement or cement-sand with water due to the vibration treatment, but another fact occurred which had not been expected, that is, that the test pieces made from the treated mortar mixtures showed very considerable increases in their strength over test pieces made from untreated mortar mixtures, in spite of the fact that the same quantities of water had been used for the preparation of the respective mixtures. The duration of the vibration treatment, which depends on the intensity of the vibrations and on the ratio of the quantity of mixture to the vibration intensity, may be from one minute to one hour. For instance, in a mixture of 500 grams of Portland cement, Holderbank brand, with various quantities of water, the following results were obtained:

TABLE I

| Mixture | H₂O in percent of cement | H₂O in g. | Vibration time in min. | Time of flow, min. | Compressive strength after 28 days in— | | Specific gravity per cm.³ |
|---|---|---|---|---|---|---|---|
| | | | | | Kg./cm.² | Percent | |
| 500 g. of cement plus | 40 | 200 | 0 | 65 | 402 | 100 | 2.05 |
| Do | 40 | 200 | 1 | 60 | 449 | 111 | 2.05 |
| Do | 40 | 200 | 5 | 22 | 489 | 121 | 2.07 |
| Do | 40 | 200 | 15 | 13 | 482 | 120 | 2.07 |
| Do | 40 | 200 | 30 | 13 | 489 | 121 | 2.09 |
| Do | 60 | 300 | 0 | 5 | 232 | 100 | 1.93 |
| Do | 60 | 300 | 1 | 4½ | 282 | 121 | 1.91 |
| Do | 60 | 300 | 5 | 4½ | 336 | 145 | 1.88 |
| Do | 60 | 300 | 15 | 4 | 538 | 232 | 2.07 |
| Do | 60 | 300 | 30 | 4 | 482 | 208 | 2.02 |

The times of flow in Table I represent the time required for 100 cm.³ of mortar to flow through a certain glass funnel. The strengths were obtained from cubes having an edge length of 5 cm., and which were stored in water after hardening.

Similar results were also obtained with Portland cements of other origin and also with slag, pozzolana, blast furnace slag, and ore cements, or the like.

The desirable effects of the new mixing and dispersing method described above can be increased considerably, and further improved properties of the cement-water-aggregate-mixtures can be obtained, if liquefaction and/or dispersion agents, and/or products which can change the surface tension between water and cement, water and aggregate, water and air, or between solid components and other solid components are also employed. These additional substances can be added in advance to the bonding agent, the aggregate or the water, or, at any other point of the mixing process, to the mixture of cement and water or cement and water and sand. These additives bring about a fine dispersion of the solid particles, liquefaction of the mixture, possibly the introduction of finely divided air, reduction of the quantity of water required for a definite consistency, and reduce the sedimentation or the separation of the mixture to a considerable extent. The use of these additives, together with the vibration treatment, can reduce the amount of water required by up to 35% and thus produce an incomparable improvement of the quality of the hardened cement-water-aggregate-mixture, in particular as far as the density, strength, contraction, frost resistance, adhesion, and interlocking with the aggregate, rock or gravel, and the composition and structure of the motar and concrete are concerned.

Suitable surface-active substances, which act as liquefying or dispersing agents and introduce little or no air into the mixture, are the known derivatives of lignin, oxyacids, organic compounds forming soluble complex calcium salts, and the like.

Known additives based on resins, fatty and oleic acids, hydroxyethylene addition products, and all foaming agents forming calcium-resistant soaps and introducing very finely divided air pores can be employed as air-introducing agents.

For special purposes sealing, water-repellent or ageing agents can also be added to the motars.

In order to further improve the stabilization of the cement and water or cement, water and aggregate mixture and to achieve a low rate of separation of water or sedimentation, gel-forming organic or inorganic additions, such as glue, casein, bentonite, silicates or silicic acid, can be added to the motar in colloidal form.

For mortars which are injected in order to fill cavities, an alkali-soluble metal can also be added with advantage in small quantities, so that an expansion of the mortar takes place due to the generation of hydrogen, and the mortar is pressed against the wall surfaces of the cavities after injection therein.

For instance, the results listed in the following Tables IIA and IIB were obtained with 1:1 cement-sand-mortars with a maximum grain size of 1 mm. and a vibration-mixing period of 10 minutes. The mixtures identified as Nos. 1 and 2 in these tables have the following compositions:

Mixture No. 1:
  450 g. of Portland cement
  450 g. of sand (grain size not exceeding 1 mm.)
  225 g. of water Mixture No. 2:
  350 g. of Portland cement
  450 g. of sand
  Reduction of Portland cement compared with mixture No. 1: 22.2%
  Quantity of water: enough to ensure the same time of flow as that of mixture No. 1, without additions and without vibration

TABLE IIA

| Mixture No. | Mixing Water content in— | | Addition | Quantity in g. | Vibration time in min. | Time of flow through funnel in sec. |
|---|---|---|---|---|---|---|
| | Cm.³ | Percent of Portland cement | | | | |
| 1 | 225 | 50 | Without | | 0 | 26 |
| 1 | 225 | 50 | Colloidal SiO₂ / Lignin sulphonate | 2.7 / 0.9 | 10 | 17½ |
| 1 | 214 | 47.5 | Colloidal SiO₂ / Lignin sulphonate | 2.7 / 0.9 | 10 | 25 |
| 2 | 170 | 48.5 | Colloidal SiO₂ / Lignin sulphonate | 2.1 / 0.7 | 10 | 27 |
| 1 | 270 | 60 | Without | | 0 | 10 |
| 1 | 270 | 60 | Colloidal SiO₂ / Lignin sulphonate | 2.7 / 0.9 | 10 | 7½ |
| 1 | 250 | 55.5 | Colloidal SiO₂ / Lignin sulphonate | 2.7 / 0.9 | 10 | 10 |
| 2 | 196 | 56 | Colloidal SiO₂ / Lignin sulphonate | 2.1 / 0.9 | 10 | 10½ |
| 1 | 315 | 70 | Without | | 0 | 5½ |
| 1 | 315 | 70 | Colloidal SiO₂ / Lignin sulphonate | 2.7 / 0.9 | 10 | 5 |
| 1 | 290 | 64.5 | Colloidal SiO₂ / Lignin sulphonate | 2.7 / 0.9 | 10 | 5¾ |
| 2 | 245 | 70 | Colloidal SiO₂ / Lignin sulphonate | 2.1 / 0.7 | 10 | 5¾ |
| 1 | 450 | 100 | Without | | 0 | 60 |
| 1 | 450 | 100 | Colloidal SiO₂ / Lignin sulphonate | 2.7 / 0.9 | 10 | 54 |
| 1 | 410 | 91 | Colloidal SiO₂ / Lignin sulphonate | 2.7 / 0.9 | 10 | 62½ |
| 2 | 345 | 98.6 | Colloidal SiO₂ / Lignin sulphonate | 2.1 / 0.9 | 10 | 61 |

TABLE IIB

| Mixture No. | Compressive strength after— | | | | | |
|---|---|---|---|---|---|---|
| | 7 days | | | 28 days | | |
| | Specific gravity, cm.³ | Kg./cm.² | Percent | Specific gravity, cm.³ | Kg./cm.² | Percent |
| 1 | 2.18 | 101 | 100 | 2.22 | 258 | 100 |
| 1 | 2.17 | 155 | 154 | 2.21 | 379 | 148 |
| 1 | 2.18 | 154 | 157 | 2.20 | 325 | 127 |
| 2 | 2.15 | 133.5 | 132 | 2.18 | 354 | 137 |
| 1 | 2.08 | 108 | 100 | 2.00 | 200 | 100 |
| 1 | 2.05 | 170 | 157 | 2.10 | 287 | 144 |
| 1 | 2.05 | 185 | 171 | 2.13 | 302 | 151 |
| 2 | 2.14 | 190 | 176 | 2.145 | 289 | 144 |
| 1 | 2.05 | 98 | 100 | 2.11 | 182 | 100 |
| 1 | 2.05 | 160 | 163 | 2.11 | 267 | 147 |
| 1 | 2.01 | 182 | 187 | 2.07 | 259 | 142 |
| 2 | 2.05 | 146 | 136 | 2.09 | 231 | 127 |
| 1 | 1.82 | 36 | 100 | 1.92 | 84.6 | 100 |
| 1 | 1.80 | 100 | 217 | 1.91 | 144 | 170 |
| 1 | 2.06 | 100 | 217 | 1.90 | 209 | 144 |
| 2 | 1.93 | 76.8 | 167 | 1.97 | 108 | 127 |

When producing cement-sand-mortars of such consistencies that they can be vibrated but not stirred, owing to the small quantity of water used for their preparation, and also when producing concrete in the traditional manner, it is convenient to apply the described vibration and stirring treatment in accordance with this invention to the cement-water suspension separately, with such suspension containing the quantities of cement and water required for the finished mortar or concrete; after which the aggregate, sand or sand and gravel, is most conveniently added to the treated suspension in a mixer and finish-mixed in the usual manner.

Also the production of air pore concrete or air pore mortar, which, after hardening, is exposed to alternating changes of frost and thaw, is carried out in the same manner, but the additives for generating or developing the air pores are added only after the vibration treatment, that is, during mixing in a conventional mixer. The addition of the air pore generating additives during the vibration treatment is not desirable, because, due to the intensive vibration and stirring, large quantities of air pores are developed, but the major part of the pores thus developed is expelled again by the vibration.

Having now particularly described and ascertained the nature of my said invention and in what manner the same is to be performed, I declare that what I claim is:

1. A method of producing mortar and the like comprising introducing a solid hydraulic cement in finely divided form and other mortar components, including at least water in an amount sufficient to form a liquid slurry of the cement, into a mixing container, immersing a plate having tapering holes therein in the liquid slurry, and vibrating said plate in the direction normal to the plane of the latter to simultaneouly effect vibration of the slurry and mixing circulation of the latter through said tapering holes for increasing the fluidity of the slurry prior to the pouring thereof and permitting a decrease in the water content of the slurry for improving the strength of the mortar following setting thereof at the location of use.

2. A method of producing concrete prior to the pouring thereof comprising introducing a solid hydraulic cement in finely divided form, sand and a quantity of water sufficient only to form a liquid slurry with the cement and sand into a mixing container, immersing a plate having tapering holes therein in the liquid slurry, vibrating said plate in the direction normal to the plane of said plate to simultaneously vibrate the slurry and produce a mixing circulation of the latter through said tapering holes for increasing the fluidity of the slurry, and subsequently mixing the fluidised slurry with aggregate to form concrete suitable for pouring into a form.

3. A method of producing concrete prior to the pouring thereof comprising introducing a solid hydraulic cement in finely divided form and at least water, in an amount sufficient to form a liquid slurry, into a mixing container, immersing a plate having tapered holes therein in said slurry, vibrating said plate in the direction normal to the plane of the latter to produce corresponding vibration of the slurry and a mixing circulation of the latter through said tapered holes to increase the fluidity of the slurry, and subsequently mixing the fluidised slurry with aggregate to form concrete of increased strength after pouring and setting of the concrete in a form due to the reduction of the water content of the slurry made possible by the increased fluidity thereof.

4. The method of producing mortar comprising introducing into a mixing container Portland cement in finely divided solid form and water in an amount equal to 40 to 60 percent, by weight, of the amount of cement, immersing a flat plate having tapered holes therein in the cement-water mixture, and vibrating said plate in the direction normal to the plane of the latter so that the cement-water mixture is correspondingly vibrated and a mixing circulation of said mixture through said holes is produced to increase the fluidity of the cement-water mixture and the strength of the latter following setting thereof at the location of use.

References Cited in the file of this patent

UNITED STATES PATENTS

| | | |
|---|---|---|
| 2,093,586 | Day | Sept. 21, 1937 |
| 2,282,190 | Jahjah | May 5, 1942 |
| 2,313,107 | Wertz | Mar. 9, 1943 |
| 2,434,302 | Wertz | Jan. 13, 1948 |